United States Patent
Howell et al.

(10) Patent No.: US 6,385,037 B2
(45) Date of Patent: May 7, 2002

(54) USER CONFIGURED PALM RESTS FOR A PORTABLE COMPUTER SYSTEM

(75) Inventors: Bryan Franklin Howell; Paul Andrew Kirchoff, both of Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/742,519

(22) Filed: Dec. 20, 2000

Related U.S. Application Data

(63) Continuation-in-part of application No. 09/314,768, filed on May 19, 1999, now abandoned.

(51) Int. Cl.$^7$ ................................................. H05K 7/12
(52) U.S. Cl. ....................... 361/683; 361/727; 345/179; 235/462
(58) Field of Search ................................. 361/681, 683, 361/685, 724–727; 345/169, 179; 235/462; 364/146; 248/118.1, 118.3, 441.8; 400/483, 485

(56) References Cited

U.S. PATENT DOCUMENTS

| | | | |
|---|---|---|---|
| 5,017,030 A | 5/1991 | Crews | 400/485 |
| 5,348,408 A | 9/1994 | Gelardi et al. | 400/715 |
| 5,355,357 A | 10/1994 | Yamamori et al. | 369/75.2 |
| 5,356,099 A | 10/1994 | Sereboff | 248/118.1 |
| 5,374,018 A | 12/1994 | Daneshvar | 248/118 |
| 5,388,032 A | 2/1995 | Gill et al. | 364/146 |
| 5,443,237 A | 8/1995 | Stadtmauer | 248/441.1 |
| 5,503,484 A | 4/1996 | Louis | 400/489 |
| 5,522,572 A | 6/1996 | Copeland et al. | 248/118.1 |
| 5,547,154 A | 8/1996 | Kirchoff et al. | 248/118.3 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,724,224 A | 3/1998 | Howell et al. | 361/680 |
| 5,775,822 A | 7/1998 | Cheng | 400/489 |
| 5,803,416 A | 9/1998 | Hanson et al. | 248/118 |
| 5,835,344 A | 11/1998 | Alexander | 361/683 |
| 5,905,632 A | 5/1999 | Seto et al. | 361/686 |
| 6,134,104 A | * 10/2000 | Mohi et al. | 361/683 |

* cited by examiner

Primary Examiner—Leo P. Picard
Assistant Examiner—Hung Van Duong
(74) Attorney, Agent, or Firm—Haynes and Boone, LLP

(57) ABSTRACT

A portable computer system has an enclosure including a base with a first surface and a microprocessor mounted in the enclosure. A keyboard is mounted in the base of the enclosure and is coupled to provide input to the microprocessor. A mass storage is coupled to the microprocessor and a display is coupled to the microprocessor by a video controller. A system memory is coupled to provide storage to facilitate execution of computer programs by the microprocessor. A support member is attached to the enclosure and at least a portion of the support member extends from the first surface of the enclosure adjacent the keyboard.

25 Claims, 4 Drawing Sheets

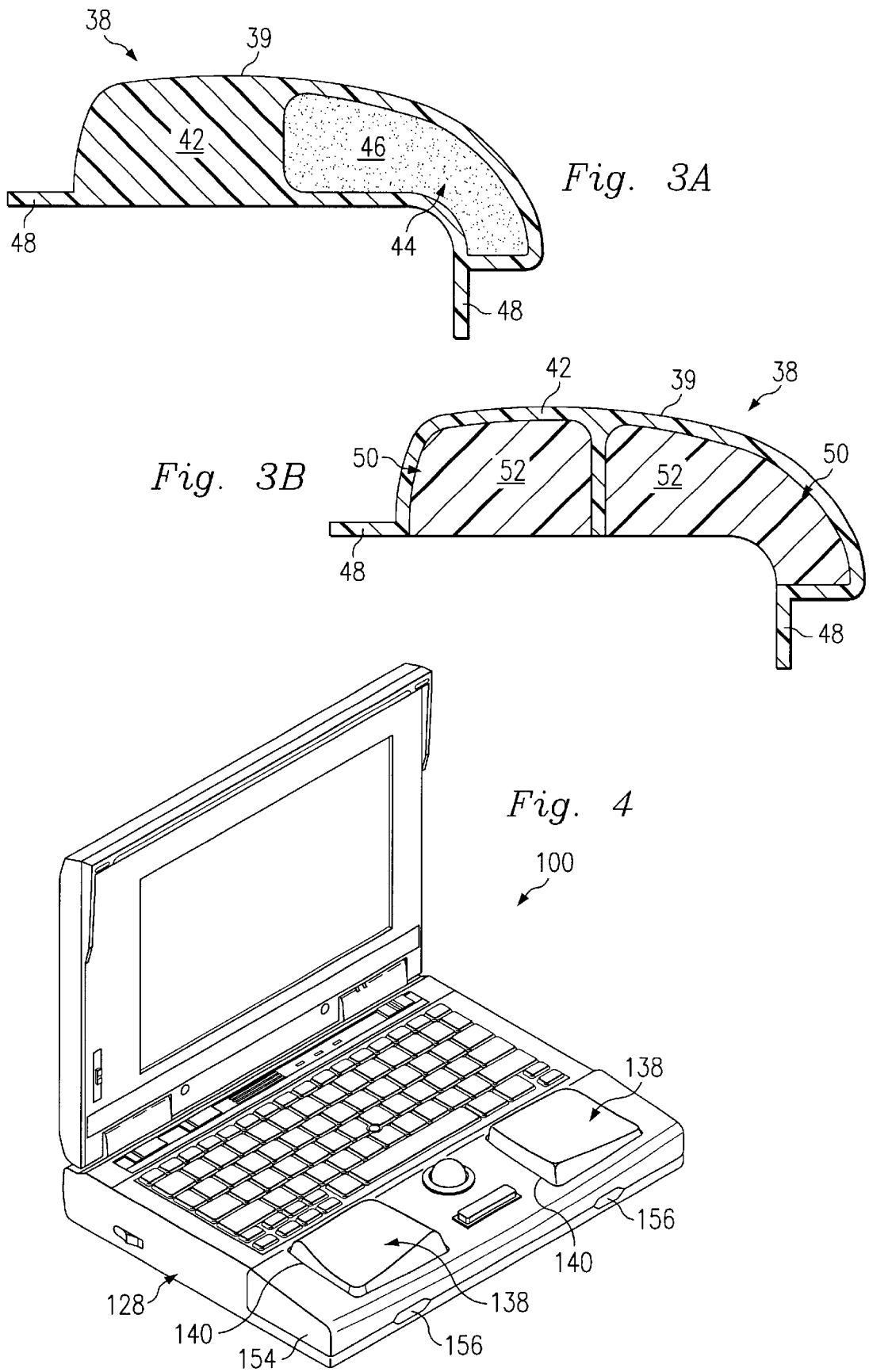

US 6,385,037 B2

USER CONFIGURED PALM RESTS FOR A PORTABLE COMPUTER SYSTEM

This application is a continuation-in-part of U.S. Ser. No. 09/314,768 filed May 19, 1999 now abandoned.

BACKGROUND

The disclosures herein relate generally to computer systems and more particularly to a user-specific palm rest configuration for portable computers.

As computer systems become more of a commodity, the strengths of brand recognition become paramount. It is known within the industry that the desire for individuality among computer products is an upcoming consumer trend, particularly for portable computer systems. This includes aesthetic as well as functional design considerations.

Similar trends in product individuality have been seen for pagers and cellular phones. Both of these product categories have offerings that allow for customer specific configurations such as configurable housing colors, materials and styles. From a functional standpoint, some computer input device manufacturers are offering different size input devices to accommodate variations in the size of a user's hands.

In the past, palm rests for keyboards have been used to aesthetically and functionally add individuality to desktop computer systems. Various types of standalone palm rest devices offered by aftermarket sources used in conjunction with keyboards for desktop computers have been suggested. In general, these types of devices are rigid or resilient support structures that are positioned adjacent the lower edge of a keyboard. Due to the nature of these types of devices they do not readily provide aesthetic or functional value for portable computer systems.

Due to the size and mobility requirements of portable computer systems, palm rest devices for these types of computer systems must be designed with these factors in mind. Reticulated palm rests that pivot from a stored to an open position in a portable computer system have been suggested. Palm rests that are integral with the carrying case of a portable computer system have also been suggested. These types of palm rest configurations offer only a limited ability to provide user-specific aesthetic and functional characteristics.

Accordingly, there is a need for a palm rest for portable computers that can be configured to satisfy the aesthetic and functional preferences of a specific user of the portable computer system.

SUMMARY

One embodiment, accordingly, provides a palm rest for portable computers that is integral with the enclosure of a portable computer system. The palm rest may be configured to address the aesthetic and functional preferences of a specific user of a portable computer system. To this end, one embodiment provides a portable computer system having an enclosure including a base with a first surface. A keyboard is mounted in the base of the enclosure and has a plurality of keys extending from the first surface. A plurality of support members are attached to the enclosure and at least a portion of one of the plurality of support members extends from the first surface of the enclosure adjacent the keyboard.

Several advantages are achieved by a palm rest for a portable computer system according to the embodiments presented herein. The palm rest may be removable from and repositionable relative to the enclosure of the computer system. The configuration of the palm rest may be customized to compliment the anatomy of a particular user of the computer system. Furthermore, the palm rest may include a resilient or rigid support member having one or more regions of different resiliency and a contoured support surface.

BRIEF DESCRIPTION OF THE DRAWING FIGURES

FIG. 3A is a cross-sectional view of the support member taken along the line designated 3—3 in FIG. 1.

FIG. 3B is a cross-sectional view illustrating an alternate embodiment of the resilient support member of FIG. 1.

FIG. 4 is perspective view illustrating a second embodiment of a computer system having attached support members.

DETAILED DESCRIPTION

Figure 1:
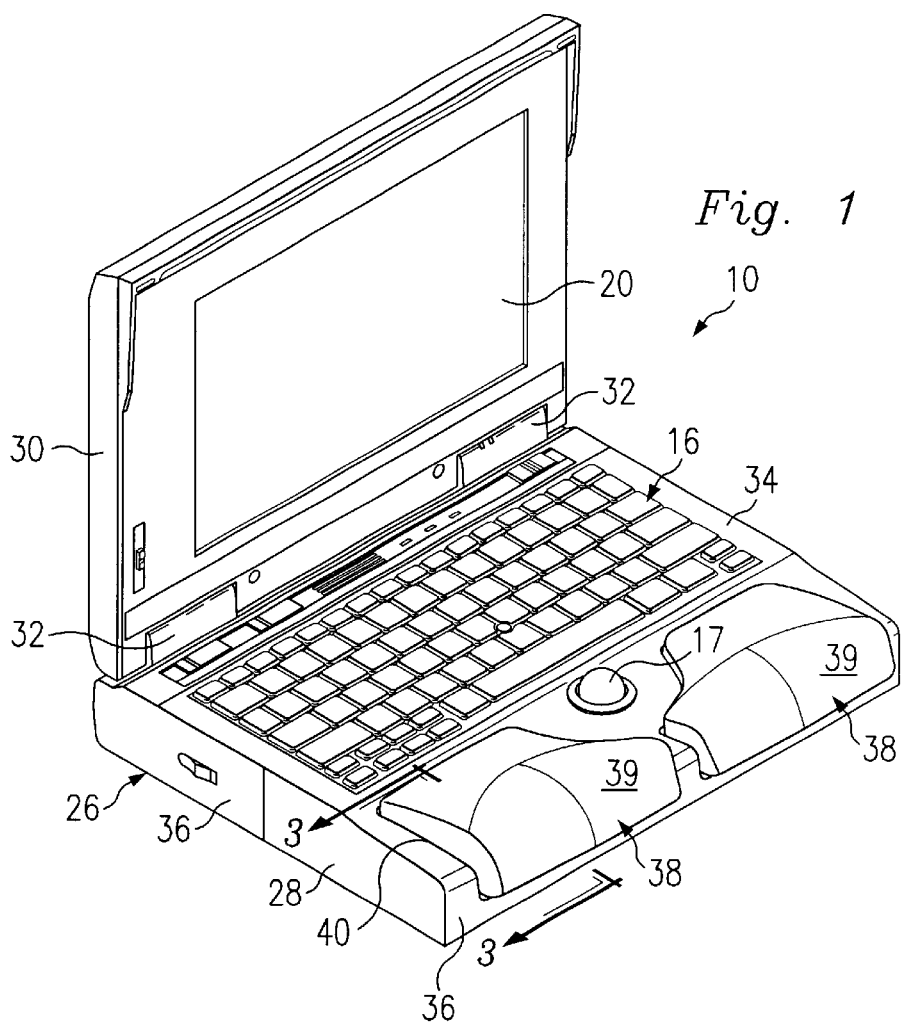
FIG. 1 is a perspective view illustrating a first embodiment of a computer system having attached support members.
Figure 2:
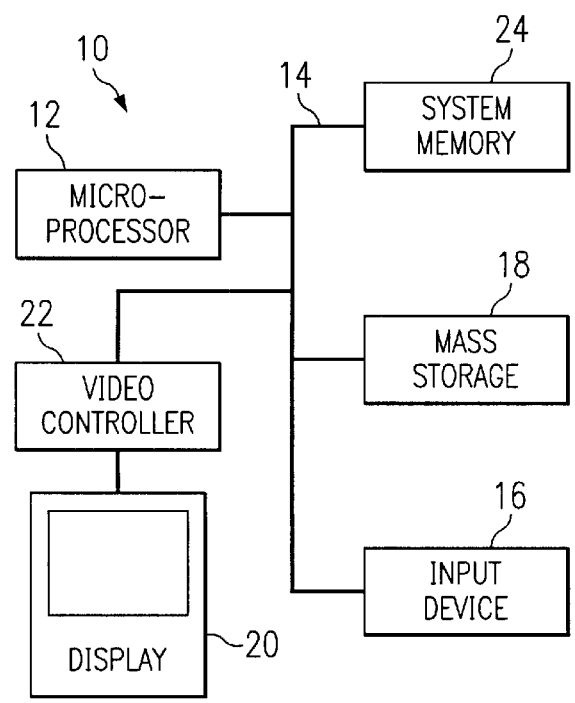
FIG. 2 is a block diagram illustrating an embodiment of a computer system.

FIGS. 1 and 2 illustrate an embodiment of a computer system, indicated generally at 10. The computer system 10 includes at least one microprocessor 12. The microprocessor 12 is connected to a bus 14. The bus 14 serves as a connection between the microprocessor 12 and other components of the computer system 10. An input device such as a keyboard 16 is coupled to the microprocessor 12 to provide input to the microprocessor 12. Examples of input devices also include touchscreens, and pointing devices such as a mouse, a trackball and a trackpad. Th computer system 10 further includes a display 20 which is coupled to the microprocessor 12 typically by a video controller 22. Programs and data are stored on a mass storage device 18 which is coupled to the microprocessor 12. Mass storage devices include components such as hard disks, optical disks, magneto-optical drives, floppy drives, and the like. A system memory 24 provides the microprocessor 12 with fast storage to facilitate execution of computer programs by the microprocessor 12. It should be understood that other busses and intermediate circuits can be employed between the components described above and microprocessor 12 to facilitate interconnection between the components and the microprocessor.

The computer system 10 includes an enclosure 26 having a base 28 and a cover 30. The cover 30 is pivotably attached to the base 28 by a pair of enclosure pivotal members 32 such as hinges. The base 28 has a first surface 34 and a plurality of edges 36. The display 20 is mounted in the cover 30. The keyboard 16 and a pointing device 17 such as a trackball are mounted in the base 28 of the enclosure 26, extending through the first surface 34.

In one embodiment, best illustrated in FIG. 1, two support members 38 are attached to the enclosure 26. The support members 38 are made of a resilient material and may have a contoured support surface 39. The support members 38 comprise a palm rest or a wrist rest and are configured to received a mating surface of a computer user's anatomy that rests on the computer while operating the keyboard 16 and the pointing device 17. The support members 38 extend through openings 40 in the base 28.

FIG. 3A illustrates the construction of the support member 38 shown in FIG. 1. The support member 38 includes a first resilient material 42 such as a foam material providing a first resiliency and a cell 44 filled with a viscous material 46 such as a water-based gel. The support member 38 also includes one or more flanges 48 that are removably engaged by the base 28 for securing the support member 38 in place. Other methods of securing the support members 38 in place such as hook and loop fasteners, adhesive, threaded fasteners or any other suitable fastening technique may also be used. In a preferred embodiment, the support members 38 are removably attached to the enclosure.

FIG. 3B illustrates a second embodiment of a support member 38 configured for use with the computer system 10 shown in FIG. 1. The support member 38 includes a first resilient material 42 formed in a fashion that establishes a plurality of cavities 50. The cavities 50 are filled with a second resilient material 52 having a second resiliency. In a preferred embodiment, the first resilient material 42 and second resilient material 52 would be foam materials having differing degrees of resiliency.

FIG. 4 illustrates an alternative embodiment of a computer system, indicated generally at 100. The computer system 100 includes a bezel 154 that is pivotably attached to the base 128 by two pivotal members 156 such as hinges. Two support members 138 are removably retained in the openings 140 of the bezel 154 by the flange 148. The bezel 154 may be moved between an open and a closed position to allow the support members 138 to be repositioned or replaced.

Figure 5:
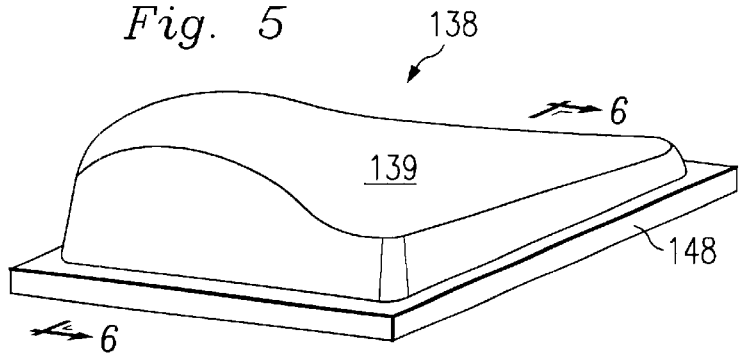
FIG. 5 is a perspective view illustrating an embodiment of the support member shown in FIG. 4.
Figure 6:
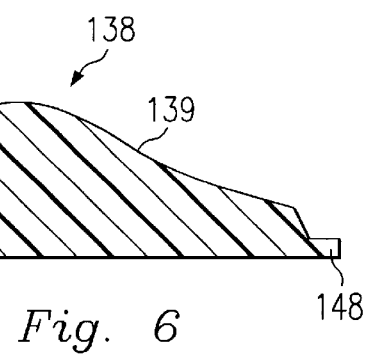
FIG. 6 is a cross-sectional view taken along the line designated 6—6 in FIG. 5.

Now referring to FIGS. 5 and 6, the support member 138 shown with the computer system 100 of FIG. 4 is illustrated. The support member 138 is generally square shaped and has a contoured support surface 139. In a preferred embodiment, the support member 138 is made of a resilient material. The support surface 139 is contoured such that repositioning of the support member 138 in the opening 140 of the bezel 154 allows the support characteristics afforded by the support member 138 to the overlying portion of the computer users anatomy to be altered. In the case of a round support member, the adjustability is continuously variable over a 360 degree range of adjustment. In the case of a square support member, the adjustability is discrete in 90 degree increments, providing four different positions.

Figure 7:
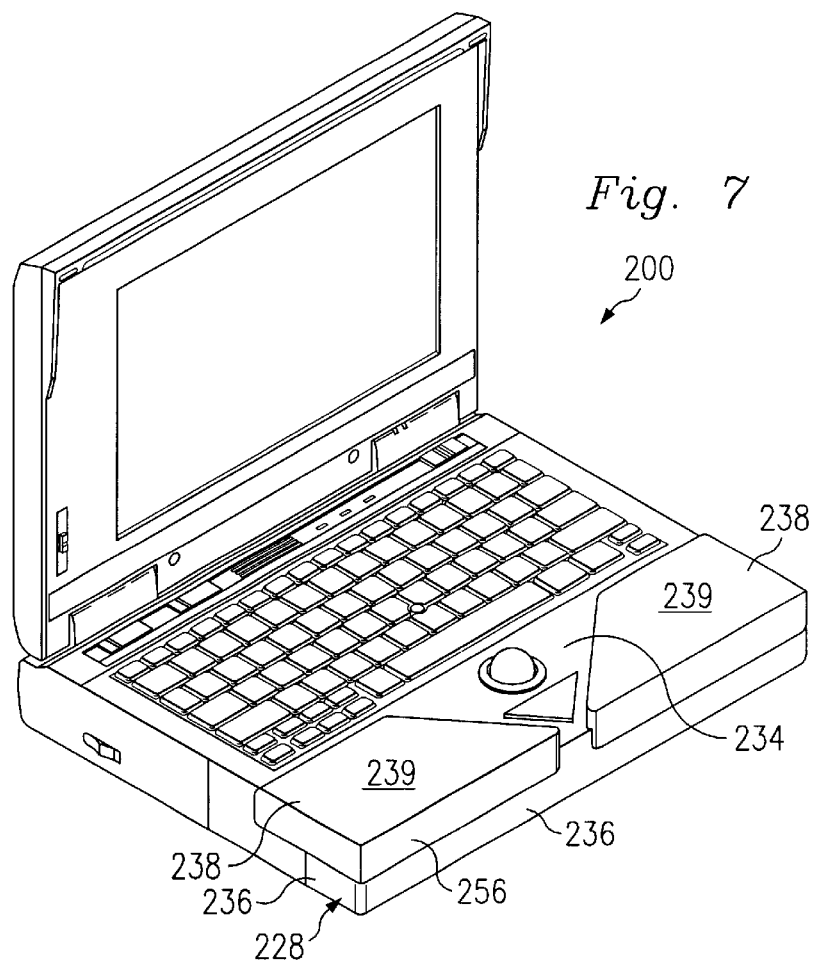
FIG. 7 is a perspective view illustrating a first embodiment of a computer system having a non-resilient support member.

In yet another alternate embodiment of a computer system, indicated generally at 200 in FIG. 7, the support members 238 are non-resilient and are attached to the first surface 234 of the base 228 using an adhesive, mechanical fasteners or any other suitable fastening technique. The attachment of the support members 238 to the first surface 234 is desirable in instances where the support members 238 are an add-on upgrade to an existing computer system. The support members 238 include edge portions 256 that lie adjacent the respective edges 236 of the base 228. The thickness and profile of the support members 238 will be especially critical for add-on applications to ensure that the cover of the computer system is not prevented from being readily closed.

It should be understood that the support members may be made of a variety of materials and constructions such as foam, wood, metal, a gel-filled bladder, carbon fiber, plastic, leather or other suitable material. Furthermore, the thickness of the support members may range from being relatively thick to relatively thin for every different type of material and construction.

Referring again to FIG. 1, an exterior surface 27 of enclosure 26 is generally formed of a plastic or a metal material of a certain commercial color and texture, such as black, gray or charcoal, for example. The palm rest components 38, may be formed of the same material, texture and color as the exterior surface 27, but are preferably formed of a different material having a more ergonomically pleasing texture, i.e. foam, gel filled, rubber, leather, vinyl, etc., and a more aesthetically pleasing color. The aspects of color, texture and material may be customer configured by customer specified order.

Figure 8:
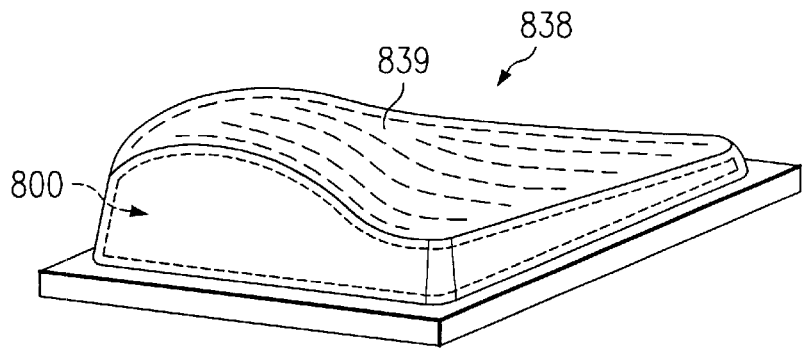
FIG. 8 is a perspective view illustrating another embodiment of the suppot member.
Figure 9:
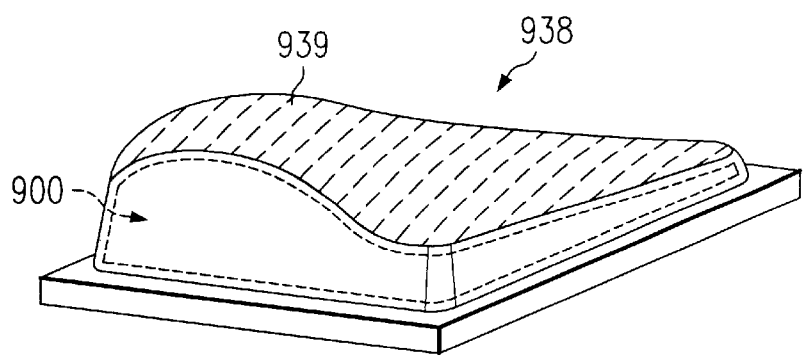
FIG. 9 is a perspective view illustrating another embodiment of the support member.

For example, a support member 838 of FIG. 8 may include a support surface 839 which is of brown leather with an inner resiliency cell 800 which is foam filled. In another example, a support member 938, FIG. 9, may include a support surface 939 which is of red vinyl with an inner resiliency cell 900 which is gel-filled.

In operation, the embodiments disclosed herein provide a portable computer system having one or more support members for supporting the palm or wrist of the computer user. While typing on the keyboard or operating a pointing device such as an integral trackball, the user may rest his or her wrist, palm or both on the support member. To accommodate different users' preferences and anatomical characteristics, the support members may be adjusted or interchanged to enhance the specific requirements of a particular user. Variables that may be altered to modify the characteristics of the support members include resiliency, size, shape and position. Also, providing support members of various contours, colors and textures, enables a user to configure the computer ergonomically and aesthetically.

As it can be seen, the embodiments presented herein provide several advantages. The palm rest components may be removable from and respositionable relative to the enclosure of the computer system. The configuration of the palm rest may be customized to ergonomically compliment the anatomy of a particular user of the computer system, or to be more aesthetically pleasing to the user. Furthermore, the palm rest may include a resilient support member having one or more regions of different resiliency and a contoured support surface.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer system, comprising:
   an enclosure including a base having a first surface and a plurality of openings formed therein;
   a keyboard mounted in the base of the enclosure, the keyboard having a plurality of keys extending from the first surface;

a plurality of support members, each support member extending through a respective opening and including a flange engaged with the enclosure adjacent the opening, and at least a portion of the support members extending from the first surface of the enclosure adjacent the keyboard; and a contoured surface formed on each support member, the support members being adjustably positionable in their respective openings, whereby the contoured surface is adjustably positionable.

2. The portable computer system of claim 1 wherein the support members are formed of a resilient material.

3. The portable computer system of claim 1 wherein the support members include a bladder, the bladder being at least partially filled with a viscous material.

4. The portable computer system of claim 1 wherein the enclosure includes a plurality of edges and wherein at least a portion of the support members extend from a respective adjacent edge of the enclosure.

5. The portable computer system of claim 1 further comprising a bezel attached to the enclosure, each of the support members extending through a respective opening in the bezel.

6. The portable computer system of claim 2 wherein each support member includes a first portion having a first resiliency and a second portion having a second resiliency, the first resiliency being different than the second resiliency.

7. The portable computer system of claim 3 wherein the bladder includes a plurality of cells.

8. The portable computer system of claim 1 wherein the contoured surface of each support member approximates a mating surface of a particular keyboard user's anatomy.

9. The portable computer system of claim 5 wherein the bezel secures the support members to the enclosure.

10. The portable computer system of claim 5 wherein the bezel is removably attached to the enclosure.

11. The portable computer system of claim 5 wherein the bezel is pivotally attached to the enclosure.

12. The portable computer system of claim 6 wherein the first portion includes a bladder, the bladder being at least partially filled with a viscous material.

13. The portable computer system of claim 6 wherein the first portion is a foam material.

14. The portable computer system of claim 7 wherein the support members are removably attached to the enclosure.

15. The portable computer system of claim 12 wherein the viscous material is a gel-type material.

16. The portable computer system of claim 12 wherein the bladder includes a plurality of cells.

17. A computer system, comprising:

an enclosure including a base having a first surface and a plurality of openings formed therein;

a microprocessor mounted in the enclosure;

an input device coupled to provide input to the microprocessor, the input device mounted in the base of the enclosure;

a mass storage coupled to the microprocessor;

a display coupled to the microprocessor by a video controller;

a system memory coupled to provide storage to facilitate execution of computer programs by the microprocessor;

a plurality of support members, each support member extending through a respective opening and including a flange engaged with the enclosure adjacent the opening and at least a portion of each support member extending from the first surface of the enclosure adjacent the input device; and a contoured surface formed on each support member, the support members being adjustably positionable in their respective openings, whereby the contoured surface is adjustably positionable.

18. A user-configured computer, comprising:

a computer housing having an exterior surface formed of a first material, the first material having a first color and a first texture;

a keyboard mounted on a portion of the exterior surface;

a palm rest area adjacent the keyboard; and at least one customer configured palm rest component detachably mounted on the palm rest area via a flange, the palm rest component having a contoured surface and being formed of a second material different from the first material and having a second color and a second texture, different from the first color and the first texture.

19. The computer as defined in claim 18 wherein the exterior surface includes an opening formed therein for receiving the palm rest component and engaging the flange, the palm rest component being adjustably positionable in the opening, whereby the contoured surface is adjustably positionable.

20. A method of user-configuring a computer comprising:

forming a computer housing including an exterior surface of a first material having a first color and a first texture;

mounting a keyboard on a portion of the exterior surface;

providing a palm rest area adjacent the keyboard;

forming a user configured palm rest component of a second material different from the first material and having a second color and a second texture, different from the first color and the first texture;

forming a flange and a contoured surface on the palm rest component; and detachably mounting the palm rest component on the palm rest area.

21. The method as defined in claim 20 further comprising:

forming an opening in the exterior surface;

adjustably positioning the palm rest component in the opening; and engaging the flange adjacent the opening, whereby the contoured surface is adjustably positionable.

22. A method of configuring a personalized ergonomic and aesthetic computer component comprising:

forming a computer housing including an exterior surface of a first material having a first color;

providing a palm rest area on the exterior surface;

forming a palm rest component including an ergonomically and aesthetically selected second material different from the first material, the second material having a second color, different from the first color;

forming a flange and a contoured surface on the palm rest component; and detachably mounting the palm rest component on the palm rest area.

23. The method as defined in claim 22 further comprising:

forming an opening in the exterior surface;

adjustably positioning the palm rest component in the opening; and engaging the flange adjacent the opening, whereby the contoured surface is adjustably positionable.

24. A user-configured computer, comprising:

a computer housing having an exterior surface formed from a first material, the first material having a first color and a first texture; and a user-configurable member including a flange and a contoured surface detachably mounted on the computer housing and having an exterior surface, the exterior surface of the user configurable member formed of a second material different from the first material and having a second color and a second texture, different from the first color and the first texture.

25. The computer as defined in claim 24 therein the exterior surface includes an opening formed therein for receiving the user configurable member and engaging the flange, the user configurable member being adjustably positionable in the opening, whereby the contoured surface is adjustably positionable.

* * * * *